United States Patent [19]

Castillo-Gonzalez

[11] 4,351,483

[45] Sep. 28, 1982

[54] SEPARATION OF ARSENIC FROM FLUORITE ORE, BY MEANS OF MAGNETIC SEPARATION AND FLOTATION OF THE PYRITES TO WHICH IT IS ASSOCIATED

[75] Inventor: Ricardo Castillo-Gonzalez, San Luis Potosi, Mexico

[73] Assignee: Cia Minera Rio Colorado, S.A., San Luis Potosi, Mexico

[21] Appl. No.: 156,524

[22] Filed: Jun. 4, 1980

[51] Int. Cl.³ .............................................. B02C 23/18
[52] U.S. Cl. ......................................... 241/24; 209/39; 209/166; 209/214
[58] Field of Search ............... 209/166, 214, 164, 232, 209/8, 39, 213, 3, 4, 167; 423/80, 151, 152; 241/20, 24

[56] References Cited

U.S. PATENT DOCUMENTS

| 92,981 | 7/1869 | Lynd | 209/214 X |
| 564,423 | 7/1896 | Edison | 423/151 X |
| 2,342,277 | 2/1944 | Neckenhoff | 209/167 |
| 2,395,475 | 2/1946 | Gibbs | 209/166 |
| 2,407,651 | 9/1946 | Clemmer | 209/166 |
| 2,556,215 | 6/1951 | Queneau | 209/166 X |
| 2,636,604 | 4/1953 | Anderson | 209/166 |
| 3,094,484 | 6/1963 | Rizo-Patron | 209/161 X |
| 3,372,803 | 3/1968 | De Lisle | 209/232 X |
| 3,456,792 | 1/1969 | Schoolcraft | 209/39 X |
| 3,595,386 | 7/1971 | Hradel | 209/39 X |
| 3,710,934 | 1/1973 | Wyman | 209/39 X |
| 4,067,953 | 1/1978 | Roux | 423/151 X |

FOREIGN PATENT DOCUMENTS

| 1212496 | 11/1970 | United Kingdom | 209/166 |
| 671855 | 7/1979 | U.S.S.R. | 209/166 |

Primary Examiner—Robert Halper
Attorney, Agent, or Firm—Ladas & Parry

[57] ABSTRACT

A procedure for the separation of arsenic from fluorite by means of magnetization and flotation of the pyrites present in the fluorite ore, and in which arsenic is associated, irrespectively of the chemical form in which said arsenic is present.

9 Claims, 1 Drawing Figure

Magnetic Activator (Magnet) — Collecting Tank — Conditioner Tank — Flotation Cells

SEPARATION OF ARSENIC FROM FLUORITE ORE, BY MEANS OF MAGNETIC SEPARATION AND FLOTATION OF THE PYRITES TO WHICH IT IS ASSOCIATED

BACKGROUND OF THE INVENTION

One of the many uses of fluorite is its use as raw material for the production of fluorhydric acid. Previously, there has been no general effort to avoid atmospheric pollution nor governmental regulations tending to prevent such atmospheric pollution through suitable measures. Fluorite, irrespectively of its quality was indiscriminately used for said purpose of producing fluorhydric acid. Nevertheless, more recently there has been a recognition of the need to prevent atmospheric pollution, rather than combating it after it is produced, and in many countries there are already regulations regarding the prevention of atmospheric pollution, which include the prohibition of the use of industrial processes, in which by any circumstance, atmospheric pollution could be produced. Many producers of fluorite of the quality found in the deposits of various countries, (which has the problem of containing as one of its generally present impurities, pyrites of the type known as arsenical pyrites), are facing more frequently the return of their fluorite concentrates by the producers of fluorhydric acid, because in most of the procedures for the production of said fluorhydric acid, the arsenic present in the arsenical pyrites associated with the fluorite is evolved as gas that necessarily goes to the atmosphere, therefore polluting it. Thus many producers of fluorite ore concentrates are at the present time searching for a procedure that permits the elimination of the arsenic present in fluorite ore, when it contains arsenical pyrites. In consequence, it is an important purpose of the present invention to provide a procedure for the separation of arsenic from fluorite ore containing arsenical pyrites, by means of a fast and economic separation of those arsenical pyrites from fluorite ore, in order that, with that separation, the separation of arsenic present on said pyrites is obtained automatically.

Other objects or purposes of this invention will be clear to those skilled in the art, from the following description of this invention.

DESCRIPTION OF THE PRIOR ART

Because of the awareness that we must prevent atmospheric pollution, and also because of the relatively recent regulations for making that prevention obligatory, it is also a recent need to find a useful and economically practicable procedure for the separation of arsenic from fluorite containing arsenical pyrites. The following related U.S. patents are not considered to anticipate in any way the procedure of the present invention:

U.S. Pat. No. 3,220,796—Espinosa: Arsenic as an element or compound is separated and recovered from nickel ores, pyrite ores, arsenic ores, etc., by passing through the arsenic-containing materials a current of hydrogen sulfide and steam at a temperature of 300° C. to 900° C.

U.S. Pat. No. 3,652,210—Smith et al: Arsenic is reduced in phosphate rock by mixing the phosphate rock with sufficient phosphoric acid to reduce the ratio of $CaO:P_2O_5$ to below 3:1. The rock is then calcined at, at least 1000° C. to produce elemental phosphorus.

U.S. Pat. No. 3,649,245—Colombo et al: Pyrite and pyrrhotite-cinders are separated from non-ferrous metals, arsenic and sulfur. Hematite is reduced to magnetite in a fluid bed by injecting hydrocarbon fuel and air at 850° C. to 950° C. to a degree of reduction of 10-90% in the presence of small quantities of HCl. Chlorination and reoxidation of the thus produced hot cinders is carried out in a fluid bed reactor with air and a chlorinating agent at 650° C. to 1000° C.

U.S. Pat. No. 3,758,293—Viviani et al: Pyrite or pyrrhotite ashes are purified by removing non-ferrous metals, arsenic and sulfur. Pyrite and pyrite ashes coming from the roasting furnace at 500° C. to 800° C. are mixed. The pyrite-ash mixture is treated in a fluid bed at 850° C. to 950° C. with a mixture of chlorine and oxygen containing gases, in which chlorine is 105–120% of stoichiometric with respect to non-ferrous metals and to arsenic present in ashes and admixed pyrite.

BRIEF DESCRIPTION OF THE DRAWING

The invention will be better understood in its various aspects, its objects and advantages will be more clear from the following description, in which there will be a reference made to the enclosed drawing. The only FIGURE of the drawing is a flow diagram showing a preferred method according to the invention for the separation of arsenic from fluorite ore, by means of a magnetic separation and by flotation of the arsenical pyrites present in the referred mineral.

DESCRIPTION OF THE PREFERRED EMBODIMENTS

Figure 1:
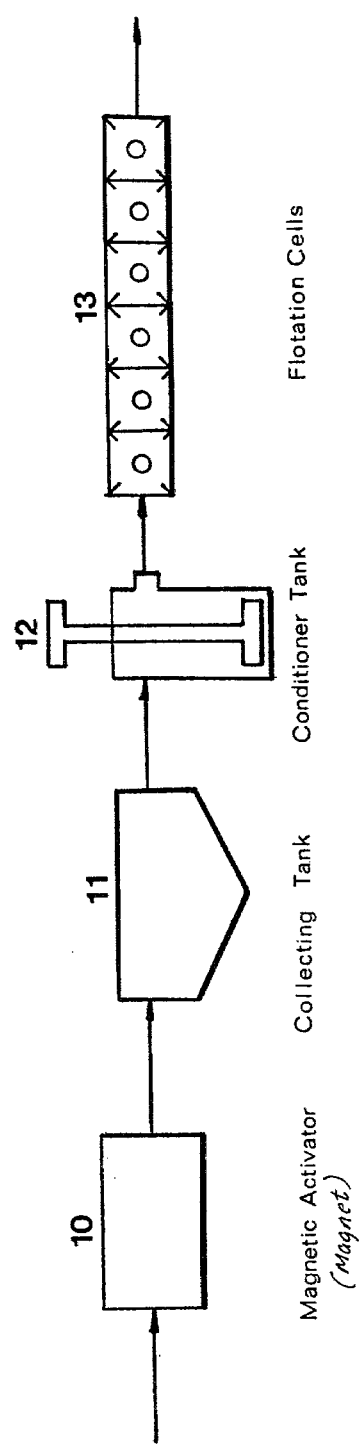

Driven by the necessity of finding out a fast and economic procedure for the separation of arsenic from fluorite, the first obvious step was to establish how that arsenic is present in the fluorite ore; determining that it is associated to the pyrites that these are present in the majority of the known fluorites, if not in all. Forthwith, the next obvious step was to determine the nature of the pyrites, finding out that these are a ferrous material. Therefore, it was concluded that, for the desired efficient, fast and economically practicable procedure for the separation of pyrites, and therefore of the arsenic from the fluorite ore, there was a need to use means able to remove ferrous materials, and after various unsuccessful experiences with other known ways used for that purpose, use of magnets was tried, which did not work, because the arsenical pyrites have particles that, in spite of their ferrous nature, are not magnetic, or very slightly magnetic. To overcome this difficulty and obtain the desired efficient and economic procedure for the separation of arsenic present in fluorite ore, after numerous experiments, it was found that an adequate way was a double separation; a magnetic separation to recover through it, the magnetic particles of pyrites, and a flotation separation for the recovery of those particles definitively not magnetic. Besides this, it was found that passing the slightly magnetic particles of the pyrites through a system of only two magnets, magnetic separation was easier, because when particles passed through the first magnet, the slightly magnetic particles of the arsenical pyrites were not attracted by it, but their magnetism was increased when they passed through the second magnet, in which they were definitively attracted and recovered.

Therefore, according to the present invention, and with reference to the only FIGURE of the drawing, the procedure involves a first step of crushing fluorite ore through an open or closed duct, simply impelled by gravity or by any kind of transport through the action of a magnetic activator (magnet) 10, where the pyrite particles increase their magnetic susceptibility followed by a second step through a collection tank 11, provided with electromagnetic bars, where the material flux is lower, the originally slightly magnetic, but already activated in their magnetic susceptibility, on their flow through the magnet are exposed a relatively larger time to the action of the electromagnetic bars of the collection tank 11 already mentioned which constitutes the second of said magnets of the system, and in that way, the particles can be collected by said electromagnetic bars from where they are periodically and automatically removed, taking their high content of arsenic load, by means of the deactivation of such electromagnetic bars. As is easy to understand, when it comes out of the conditioner tank 12, fluorite ore still retains the non-magnetic pyrites, and therefore the procedure also includes the flow of fluorite ore from which arsenical pyrites have already been collected through a conditioner tank 12, in which a charge of chemical agents in present for the flotation of pyrite, so that after an adequate conditioning time of about 15 minutes, the flourite ore already conditioned for flotation passes to a cell or to a bank or system of flotation cells in convenient or adequate number, for example, six, where flotation of non-magnetic pyrites with their arsenic content is produced. From the bank of flotation cells, the fluorite ore charge is feeded to a normal concentration procedure, retaining an acceptable minimum of particles with arsenical content that according to tests is not greater than 30% of the original arsenic content, which means that the invention procedure is suitable for separating at least 70 percent of the arsenic originally present in treated fluorite ore.

As chemical agents for the flotation, there have been determined as efficient, copper sulphate, sodium sulphur and foaming agents, preferably on mixtures, but always being present amyl potassium xanthate or a chemical equivalent, because said xanthate is the main promotor agent for the flotation of arsenical pyrites.

Of course, any kind of change in the mixture of the flotation activating agents can be developed and the practice of the procedure still be in the scope of this invention, because it is obvious for the experts in the art, that the interesting point is to provide an adequate flotation medium inside the cells of the flotation system.

EXAMPLE

To illustrate an adequate way of carrying out the procedure of this invention, but meaning in no way a limitation in the scope of the same, because such scope is determined on the claims that appear at the end of this specification, the following example is provided:

Fluorite ore as obtained from the "El Refugio" mine located in the state of Guanajuato, in the Mexican Republic and tested to contain 250 parts of arsenic per million confined in pyrites associated to said fluorite ore, were milled to a degree able to pass through a 200 mesh (Tyler) in at least 85% of the load.

The mineral, because of its necessity to be milled in humid state, forms a pulp, which was conducted preferably by gravity or by mechanic means to a magnet with an intensity not under 18,000 Gauss, where slightly mgnetic pyrite present on the ore, was stimulated to increase its magnetic susceptibility. Then the pulp was conducted at low flow rate to a tank where mgnetic pyrite particles remained exposed and the particles were collected by the electromagnetic bars arranged in the interior of the tank, followed by withdrawing the collected particles, with their high arsenic content from the electromagnetic bars by periodic deactivation of these bars. For flotation of the pulp there was used a mixture of the following flotation chemical agents:

Copper sulphate: 0.250 Kg/Ton.
Amyl potassium xanthate: 0.163 Kg/Ton.
Sodium sulphur: 0.050 Kg/Ton.
Foaming agent (*): 0.050 Kg/Ton.

*Teefroth A,/Trademark of the foaming agent used in the example.

After approximately 15 min. of duration of the conditioning of the ore pulp inside the conditioning tank, said pulp was passed to a flotation bank compossed of six cells of 2.85 cubic meters of capacity, where the flotation of the non-magnetic pyrites was made with their arsenic content. Then, the charge of the flotation cells was incorporated to a normal procedure for the concentration of fluorite to the acid grade. Finally, the obtained concentrate was analyzed and it was established that the original amount of arsenic present on the treated fluorite ore was reduced by 70%.

Having this way described the invention, what is claimed is:

1. A process for separating arsenic in all its forms present in pyrites from fluorite ore, said pyrites including at least one of magnetic, non-magnetic and slightly magnetic pyrites, comprising the sequence of the following steps:
   (A) wet milling the ore to obtain a pulp of fluorite ore of which at least 85 percent passes through a 200 mesh (Tyler);
   (B) subjecting the pulp to the action of a magnet effective to magnetically activate most of the non-magnetic and the slightly magnetic pyrites;
   (C) recovering the magnetic pyrites in a collection tank by means of one or more electromagnetic bars positioned inside said tank; and
   (D) finally recovering the remaining non-magnetic and slightly magnetic pyrites by conditioning these pyrites with flotation chemical agents followed by flotation in flotation cells.

2. A process according to claim 1, wherein the magnetic activation of the pyrite particles and the following recovery of sid particles with magnetic susceptibility, is increased by using two electro magnets used in sequence.

3. A process according to claim 1 or 2, wherein the intensity of the magnetic activation is at least 18,000 gauss.

4. A process according to claim 1 or 2, wherein the collection of the magnetic pyrite particles is made while reducing the speed of the flow of the ore in the pulp state through the collection tank.

5. A process according to claim 1 or 2, wherein the conditioning of the pulp of fluorite ore for flotation is performed in the presence of a mixture of flotation chemical agents, including amyl potassium xanthate.

6. A process according to claim 5, wherein the mixture of flotation chemical agents includes copper sulfate, sodium sulfide and a foaming agent.

7. A process according to claim 1 or 2, wherein the flotation is made in only one cell or in a battery of two or more flotation cells.

8. A process according to claim 1 or 2, wherein the process is carried out in a continuous way.

9. A process according to claim 1 or 2, wherein the process is carried out in batches.

* * * * *